(12) United States Patent
Berselli

(10) Patent No.: US 12,106,464 B2
(45) Date of Patent: Oct. 1, 2024

(54) MULTI-SHOT ILLUMINATION CONTROL USING PRESET LIGHTING PROGRAM ACTIVATING LIGHTING GROUPS AND ACQUIRING IMAGES FOR OPTICAL INSPECTION

(71) Applicant: DOSS VISUAL SOLUTION S.R.L., Bergamo (IT)

(72) Inventor: Hemiliano Berselli, Bergamo (IT)

(73) Assignee: DOSS VISUAL SOLUTION S.R.L., Bergamo (IT)

( * ) Notice: Subject to any disclaimer, the term of this patent is extended or adjusted under 35 U.S.C. 154(b) by 6 days.

(21) Appl. No.: 17/602,184

(22) PCT Filed: Apr. 7, 2020

(86) PCT No.: PCT/IB2020/053298
§ 371 (c)(1),
(2) Date: Oct. 7, 2021

(87) PCT Pub. No.: WO2020/208512
PCT Pub. Date: Oct. 15, 2020

(65) Prior Publication Data
US 2022/0148155 A1    May 12, 2022

(30) Foreign Application Priority Data

Apr. 10, 2019   (IT) .................. 102019000005536

(51) Int. Cl.
*G06T 7/00*       (2017.01)
*G01N 21/95*      (2006.01)
(Continued)

(52) U.S. Cl.
CPC ........... *G06T 7/0004* (2013.01); *G01N 21/95* (2013.01); *G02B 17/002* (2013.01); *H04N 5/04* (2013.01);
(Continued)

(58) Field of Classification Search
CPC ......... G06T 7/0004; G06T 2207/10152; G06T 2207/10144; G06T 2207/10016; H04N 23/74; G01N 2021/8835; G01N 2021/8841
See application file for complete search history.

(56) References Cited

U.S. PATENT DOCUMENTS 5,072,127 A      12/1991  Cochran et al.
6,201,892 B1 *    3/2001  Ludlow ............... G06V 10/147
                                                    250/559.34
(Continued)

FOREIGN PATENT DOCUMENTS

CN       103884650 A2    6/2014
DE    102015105656 A1   10/2016
(Continued)

OTHER PUBLICATIONS

Y. Y. Schechner, S. K. Nayar and P. N. Belhumeur, "Multiplexing for Optimal Lighting," in IEEE Transactions on Pattern Analysis and Machine Intelligence, vol. 29, No. 8, pp. 1339-1354, Aug. 2007, doi: 10.1109/TPAMI.2007.1151. (Year: 2007).*

*Primary Examiner* — Michael Robert Cammarata
(74) *Attorney, Agent, or Firm* — ArentFox Schiff LLP; Michael Fainberg

(57) ABSTRACT

A method for acquiring images of a part to be inspected comprises the following steps framing the part with a digital video camera providing an illuminator comprising a plurality of illumination sources arranged to illuminate various portions of the part or to illuminate the part from different angles, wherein individual illumination sources or groups of illumination sources are controlled individually by means of an illumination control unit operationally connected to the digital video camera; controlling the video camera to take a series of shots of framed part, with each shot being defined by a preset exposure time with each shot and for the duration (Continued)

of the exposure time generating a part illumination condition through the illumination control unit by activating a portion of the individual illumination sources or groups of illumination sources so the sequence of shots is taken with different corresponding lighting conditions according to a preset lighting program.

6 Claims, 2 Drawing Sheets

(51) Int. Cl.
    *G02B 17/00*     (2006.01)
    *H04N 5/04*     (2006.01)
    *H04N 5/84*     (2006.01)
    *H04N 23/56*     (2023.01)
    *H04N 23/74*     (2023.01)

(52) U.S. Cl.
    CPC ............... *H04N 5/84* (2013.01); *H04N 23/56* (2023.01); *H04N 23/74* (2023.01); *G06T 2207/10016* (2013.01); *G06T 2207/10152* (2013.01); *G06T 2207/30164* (2013.01); *G06T 2207/30168* (2013.01)

(56) References Cited

U.S. PATENT DOCUMENTS

| | | | | |
|---|---|---|---|---|
| 6,207,946 | B1* | 3/2001 | Jusoh | G01N 21/8806 |
| | | | | 250/559.34 |
| 10,824,055 | B1* | 11/2020 | McGuire | F21S 4/28 |
| 10,897,797 | B2* | 1/2021 | Franciosa | H05B 47/155 |
| 11,442,020 | B2* | 9/2022 | Lang | H04N 23/56 |
| 2008/0170380 | A1* | 7/2008 | Pastore | G06K 7/10742 |
| | | | | 362/16 |
| 2015/0355101 | A1* | 12/2015 | Sun | G06T 7/586 |
| | | | | 348/46 |
| 2016/0210524 | A1* | 7/2016 | Hasegawa | G01N 21/9508 |
| 2017/0089840 | A1* | 3/2017 | Hashiguchi | G01N 21/8806 |
| 2018/0165820 | A1* | 6/2018 | Rhodes, Jr. | G01N 21/01 |
| 2018/0252691 | A1 | 9/2018 | Blanc | |
| 2018/0330489 | A1* | 11/2018 | Kido | G06T 7/0004 |
| 2019/0104577 | A1* | 4/2019 | Miller | H05B 45/00 |
| 2019/0188841 | A1* | 6/2019 | Kato | G06T 7/0004 |
| 2019/0268522 | A1* | 8/2019 | Hayashi | G06T 7/0004 |
| 2019/0289189 | A1* | 9/2019 | Inazumi | G01N 21/8806 |
| 2020/0175669 | A1* | 6/2020 | Bian | G06T 7/0004 |
| 2020/0340929 | A1* | 10/2020 | Chehaiber | G01N 21/8806 |
| 2020/0412932 | A1* | 12/2020 | Naruse | G06N 20/00 |
| 2021/0299879 | A1* | 9/2021 | Pinter | B25J 9/1697 |
| 2022/0178839 | A1* | 6/2022 | Berselli | H04N 23/56 |
| 2022/0262019 | A1* | 8/2022 | Watanabe | H04N 23/74 |
| 2023/0021095 | A1* | 1/2023 | Zhou | G01N 21/95 |
| 2023/0038844 | A1* | 2/2023 | Li | H04N 23/741 |

FOREIGN PATENT DOCUMENTS

| | | | | |
|---|---|---|---|---|
| EP | 0955538 | A1 * | 11/1999 | |
| EP | 1455179 | A1 | 8/2004 | |
| EP | 1748643 | A2 | 1/2007 | |
| EP | 2280270 | A1 | 2/2011 | |
| JP | 2006174984 | A * | 7/2006 | |
| JP | 4061637 | B2 * | 3/2008 | |
| JP | 200969131 | A | 4/2009 | |
| KR | 20170121840 | A * | 11/2017 | |
| WO | WO-9922224 | A1 * | 5/1999 | ......... G01N 21/8806 |
| WO | WO-2014161255 | A1 * | 10/2014 | ......... F21K 9/1355 |
| WO | 2015056186 | A1 | 4/2015 | |
| WO | WO-2020049551 | A1 * | 3/2020 | ......... G01N 21/8806 |

* cited by examiner

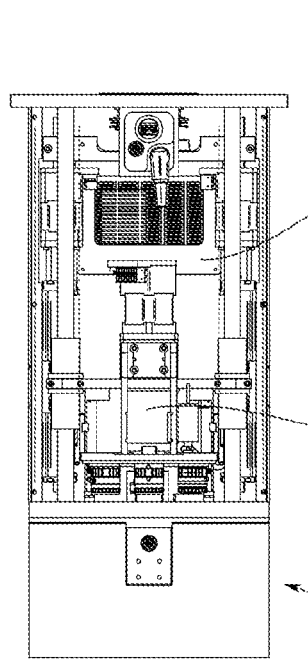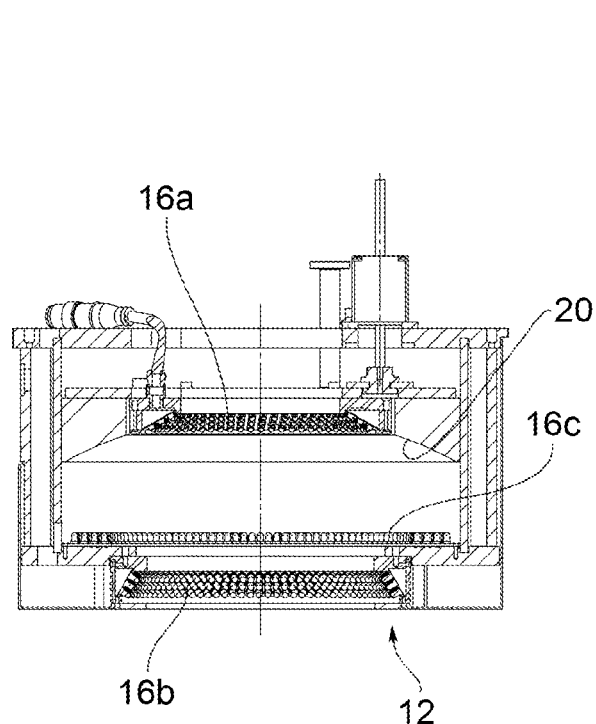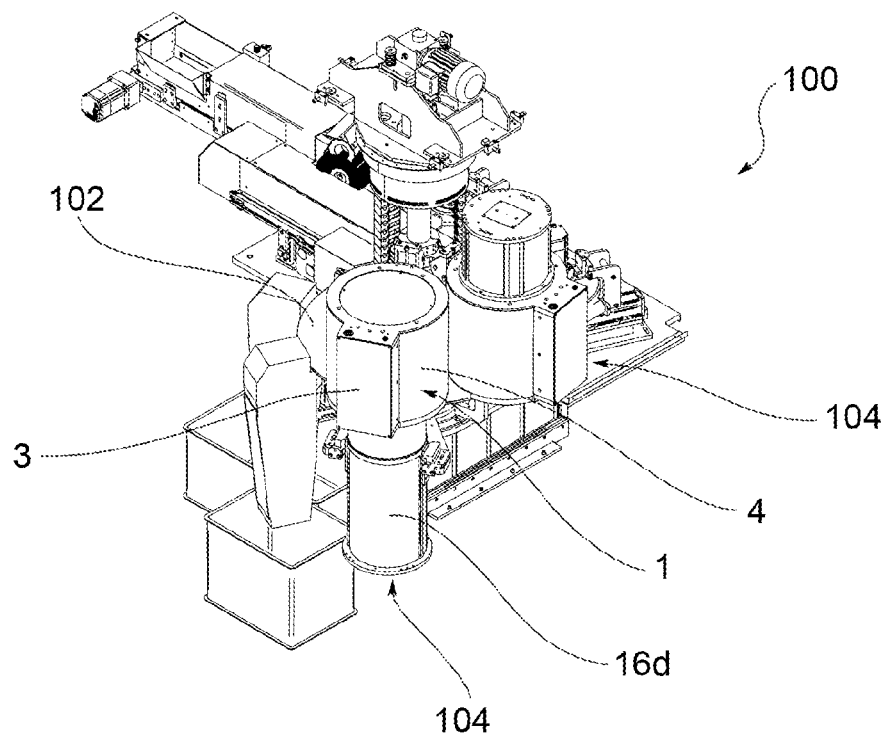

MULTI-SHOT ILLUMINATION CONTROL USING PRESET LIGHTING PROGRAM ACTIVATING LIGHTING GROUPS AND ACQUIRING IMAGES FOR OPTICAL INSPECTION

CROSS-REFERENCE TO RELATED APPLICATIONS

This application is a National Phase Application of PCT International Application No. PCT/IB2020/053298, having an International Filing Date of Apr. 7, 2020 which claims priority to Italian Application No. 102019000005536 filed Apr. 10, 2019, each of which is hereby incorporated by reference in its entirety.

FIELD OF THE INVENTION

The present invention refers to a method for acquiring images of a part to undergo optical inspection and a viewing group implementing said method, in particular for an optical inspection machine for the quality control of parts, for example gaskets.

BACKGROUND OF THE INVENTION

There are known optical inspection machines for the quality control of parts. Generally, these machines comprise a rotary table on which parts to be inspected are placed, and inspection stations arranged above the rotary table so as to subject the part to various optical inspections. The inspection stations are configured to acquire various images of the part, which differ depending on the various positions of the video cameras and/or various lighting conditions of the part.

It is obvious that the greater the accuracy of the required quality control, the greater the number of inspection stations required to acquire various images of the part. This results in an increase in the size of the machine and the time to complete an inspection cycle.

Efforts have been made to reduce the number of inspection stations and consequently the overall size of the machine and the inspection cycle time, by illuminating the part in the inspection station with several light sources that illuminate the part from various directions and with different colors of the light beam.

An image processing unit connected to the video camera acquires the image obtained by the video camera and performs a certain number of filtering operations on the image so that the part is represented with the data of a single color at a time, and then emphasizes the surfaces most exposed to the illumination source of that color.

The overall image of the part is then obtained by interpolation of the data obtained in the filtering operation. It is obvious that the resolution of the final image is much lower than that of the image obtained before the filtering operation. In some cases this loss of resolution may entail an unacceptable drop in the accuracy of the dimensional check of the part.

SUMMARY OF THE INVENTION

The purpose of this invention is to propose an image acquisition method, particularly for a viewing group of a machine for the quality control of parts, which can reduce the number of inspection stations and therefore the overall size of the machine and the part inspection cycle time, but without suffering the serious drawback mentioned above regarding a loss of resolution of the image used to conduct the dimension check on the part.

This purpose is achieved with an image acquisition method, with a viewing group, and with an optical inspection machine. The disclosure further describes preferred embodiments of the invention.

The features and advantages of the method, the viewing group, and the machine according to the invention will become clear from the description given below of preferred embodiments, given solely as non-limiting examples, in reference to the enclosed figures, wherein:

BRIEF DESCRIPTION OF THE DRAWINGS

FIG. 4 is a cross-sectional view of an example of an illuminator for the viewing group according to the invention;

FIG. 5 is an elevation view of an embodiment of a viewing group according to the invention; and FIG. 6 is a perspective view of an example of an optical inspection machine for the quality control of parts that uses the viewing group of FIG. 5.

DETAILED DESCRIPTION

Figure 1:
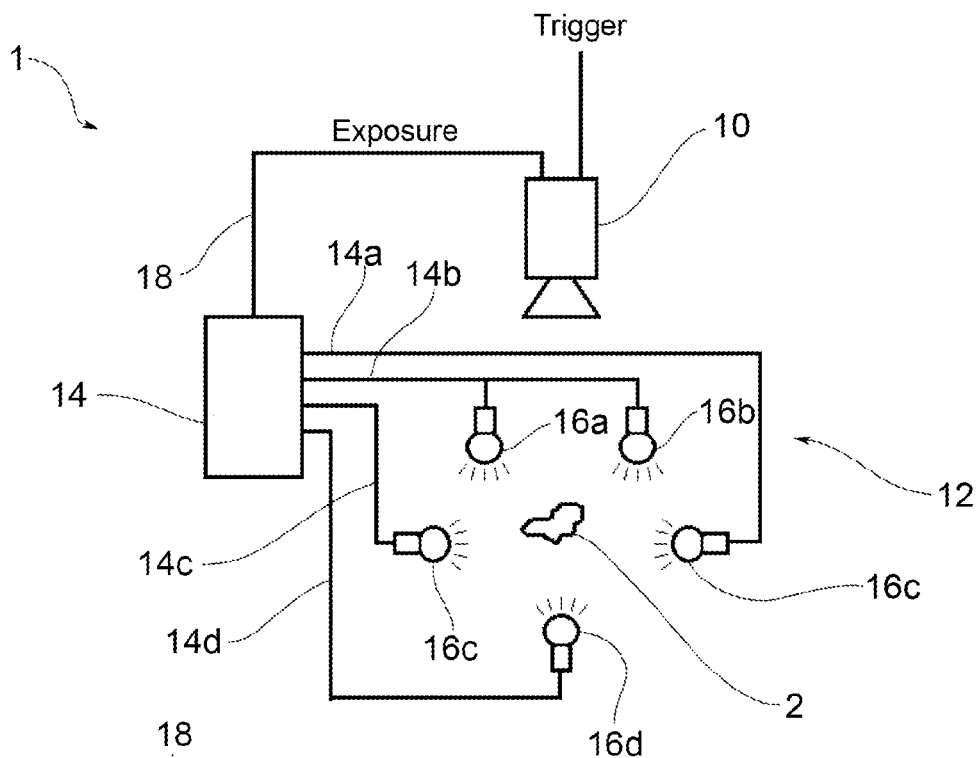
FIG. 1 is a schematic representation of a viewing group according to the invention.

In said drawings, number 1 refers to a viewing group as a whole for acquiring images of a part 2 to be subjected to a dimensional check.

Viewing group 1 comprises a controllable digital video camera 10 for taking a series of images of framed part 2.

Digital video camera 10 preferably has a high frame rate. For example, digital video camera 10 is capable of working, for instance, from 100 to 600 Hz (that is, 100 to 600 images per second). Each shot is defined by a preset "exposure" time, as indicated in the example shown.

Viewing group 1 also comprises a group control unit, housed for example in a special space 3 of housing 4 that contains viewing group 1 in the example of a viewing machine 100 shown in FIG. 6. The unit control assembly is operationally connected to digital video camera 10 and is programmed to generate a series of control pulses ("trigger" signals in FIGS. 1 and 2) for digital video camera 10.

Viewing group 1 also comprises an illuminator 12 suitable for illuminating part 2 to be inspected, and an illumination control unit 14 operationally connected to illuminator 12.

Illuminator 12 comprises a plurality of illumination sources 16a, 16b, 16c, 16d, and 16e arranged to illuminate various portions of the part or to illuminate the part from different angles.

Illumination control unit 14 has a plurality of output channels 14a-14d, one for each individual illumination source and/or for each group of illumination sources.

Illumination control unit 14 is programmed to activate an output channel or a combination of output channels in response to an input signal 18 synchronized to the "trigger" control pulses of digital video camera so as to generate a sequence of flashes s0-s3 of individual illumination sources and/or of individual groups of illumination sources according to a preset illumination program.

In one embodiment, illumination control unit 14 is programmed to adjust the brightness of individual illumination sources 16-16*e* and/or of the individual groups of illumination sources on the output channels activated according to the lighting program.

In one embodiment shown in FIG. 1, input signal 18 is fed to illumination control unit 14 by digital video camera 10. For example, input signal 18 remains active for the exposure time so that the activated sources or groups of sources remain on for that amount of time.

Figure 2:
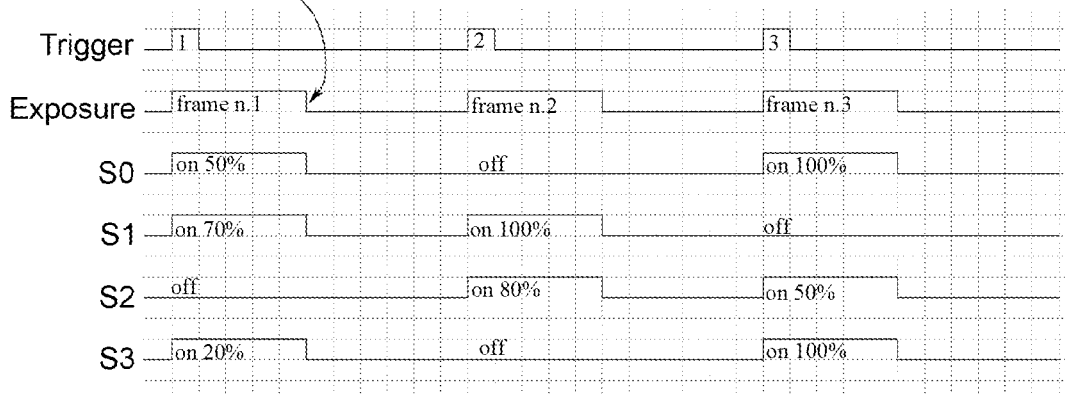
FIG. 2 is a time chart of the image acquisition method according to the invention.

In the chart of FIG. 2, for example, the lighting program specifies that, in response to a first control pulse from digital video camera 10, and for the duration of the exposure time, a first illumination source is turned on with 70% brightness, a second illumination source is turned on with 50% brightness, and a fourth illumination source is turned on with 20% brightness. A third illumination source is left off.

In response to a second control pulse from digital video camera 10, and for the duration of the exposure time, the second illumination source is turned on with 100% brightness and a third illumination source is turned on with 80% brightness, whereas the first and fourth illumination sources are kept off.

In response to a third control pulse from digital video camera 10, and for the duration of the exposure time, the first illumination source is turned on with 100% brightness, the third illumination source is turned on with 50% brightness, and the fourth illumination source is turned on with 100% brightness. The second illumination source is left off.

Figure 3:
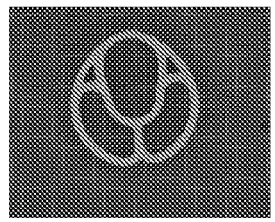
FIGS. 3, 3a, and 3b are three examples of various images of the same part obtained with the method and viewing group according to the invention.
Figure 3A:
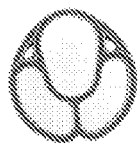
Figure 3B:

FIGS. 3-3*b* show three different images of part 2 obtained with the various lighting conditions.

As an innovation, each of the various images of the part, which represent various portions of the part's surface and/or represent the part with differing contrasts, has the maximum possible resolution because it is not obtained through filtering operations but rather from an appropriate selection of the illumination sources to be activated with each shot of the video camera. Consequently, the quality of the part's dimension measurement is the best possible for a given resolution of the video camera.

In one embodiment shown in FIG. 4, illuminator 12 comprises a direct illumination source 16*a* suitable for primarily illuminating the upper surface of the part, a low-angle illumination source 16*b* suitable for primarily illuminating side surface portions of the part, and a diffuse illumination source 16*c* suitable for illuminating the part with a light beam reflected and diffused from a reflective concave surface 20.

In one embodiment shown for example in FIG. 6, illuminator 12 further comprises a backlighting source 16*d* suitable for illuminating the part from the opposite direction compared to the direction of the light beam emitted from direct illumination source 16*a*.

FIG. 6 shows an example of an optical inspection machine 100 for the quality control of parts, in particular gaskets. Machine 100 comprises a rotary table 102 on which are positioned parts to be inspected, at least one inspection station 104 comprising, above said rotary table, at least one viewing group 1 as described above for inspecting one or more outer and/or inner surfaces of the parts placed on rotary table 102.

Machine 100 is provided with a processing unit, not shown, operationally connected to digital video camera 10 and suitable for acquiring the images of the part taken by the video camera under the various lighting conditions determined by the lighting program. Machine 100 is also provided with a user interface comprising a monitor on which the processing unit displays the images of the part, for example the images in FIGS. 3, 3*a*, and 3*b*.

The invention also refers to a method for acquiring images of a part 2 to be inspected, comprising the following steps:
framing part 2 with a digital video camera 10;
providing an illuminator 12 that comprises a plurality of illumination sources 16*a*-16*e* arranged so as to illuminate various portions of the part or to illuminate the part from different angles, wherein individual illumination sources or groups of illumination sources are controlled individually by means of an illumination control unit 14 operationally connected to the digital video camera;
controlling video camera 10 to take a series of shots of the framed part, with each shot being defined by a preset exposure time;
with each shot and for the duration of the exposure time, generating a part illumination condition through illumination control unit 14 by activating a portion of the individual illumination sources or groups of illumination sources so that the sequence of shots is taken with different corresponding lighting conditions according to a preset lighting program.

In one embodiment, the individual illumination sources or individual groups of illumination sources controllable by the illumination control unit 14, not only in terms of turning them on and off, but also in terms of adjusting the brightness level of the emitted light.

In one embodiment, video camera 10 itself sends an input signal to illumination control unit 14 in response to the control signal received by video camera 14.

In order to satisfy contingent requirements, a person skilled in the art could make modifications, adaptations, and substitutions of parts with functionally equivalent ones to the embodiments of the method and viewing group according to the invention. Each feature described as belonging to a possible embodiment may be implemented independently of the other described embodiments.

The invention claimed is:

1. An optical inspection machine for quality control of parts, comprising:
    a rotary table on which parts to be inspected are placed;
    at least one inspection station comprising the rotary table;
    at least one viewing group, the viewing group being for inspecting one or more outer or inner surfaces of a part, the viewing group comprising:
        a digital video camera that can be controlled to take a series of shots of a framed part, with each shot being defined by a preset exposure time;
        a group control unit operationally connected to the digital video camera and programmed to generate a series of control pulses for the digital video camera;
        an illuminator comprising a plurality of illumination sources arranged to illuminate various portions of the part or to illuminate the part from different angles, wherein the illuminator comprises:
        a direct illumination source suitable for primarily illuminating the upper surface of the part,
        a low-angle illumination source suitable for primarily illuminating side surface portions of the part, and
        a diffuse illumination source suitable for illuminating the part with a light beam reflected and diffused from a reflective concave surface; and
        an illumination control unit having several output channels, one for each individual illumination source and/or for each group of illumination sources, the illumination control unit being programmed to simultaneously activate one or a combination of said output channels in response to an input signal synchronized to the series of control pulses of the digital video camera so as to generate a series of flashes of individual illumination sources or individual groups of illumination sources according to a preset lighting program, wherein the individual illumination sources or the individual groups of illumination sources are controlled individually;

a processing unit operationally connected to the digital video camera and suitable for acquiring the images of the part taken by the video camera under various lighting conditions set by the preset lighting program; and a user interface comprising a monitor on which the processing unit displays said images of the part, wherein the reflective concave surface extends downwardly from a peripheral edge of the direct illumination source, and wherein the diffuse illumination source is arranged on a plane between the direct illumination source and the low-angle illumination source.

2. The optical inspection machine according to claim 1, wherein the individual illumination sources or individual groups of illumination sources are adjustable for brightness when activated.

3. The optical inspection machine according to claim 1, wherein the digital video camera sends the input signal to the illumination control unit in response to a control signal being received by the video camera.

4. The optical inspection machine according to claim 1, wherein the illumination control unit is programmed to adjust the brightness of the individual illumination sources or the individual groups of illumination sources on the output channels activated according to the preset lighting program.

5. The optical inspection machine according to claim 1, wherein said input signal synchronized to the series of control pulses of the digital video camera is fed to the illumination control unit by the digital video camera.

6. The optical inspection machine according to, claim 1 wherein the illuminator further comprises: a backlighting source suitable for illuminating the part from an opposite direction compared to a direction of a light beam emitted from the direct illumination source.

\* \* \* \* \*